July 12, 1927.
J. C. POTH
1,635,953
DUMPING UNIT FOR MOTOR TRUCKS
Filed Oct. 2, 1924
3 Sheets-Sheet 1
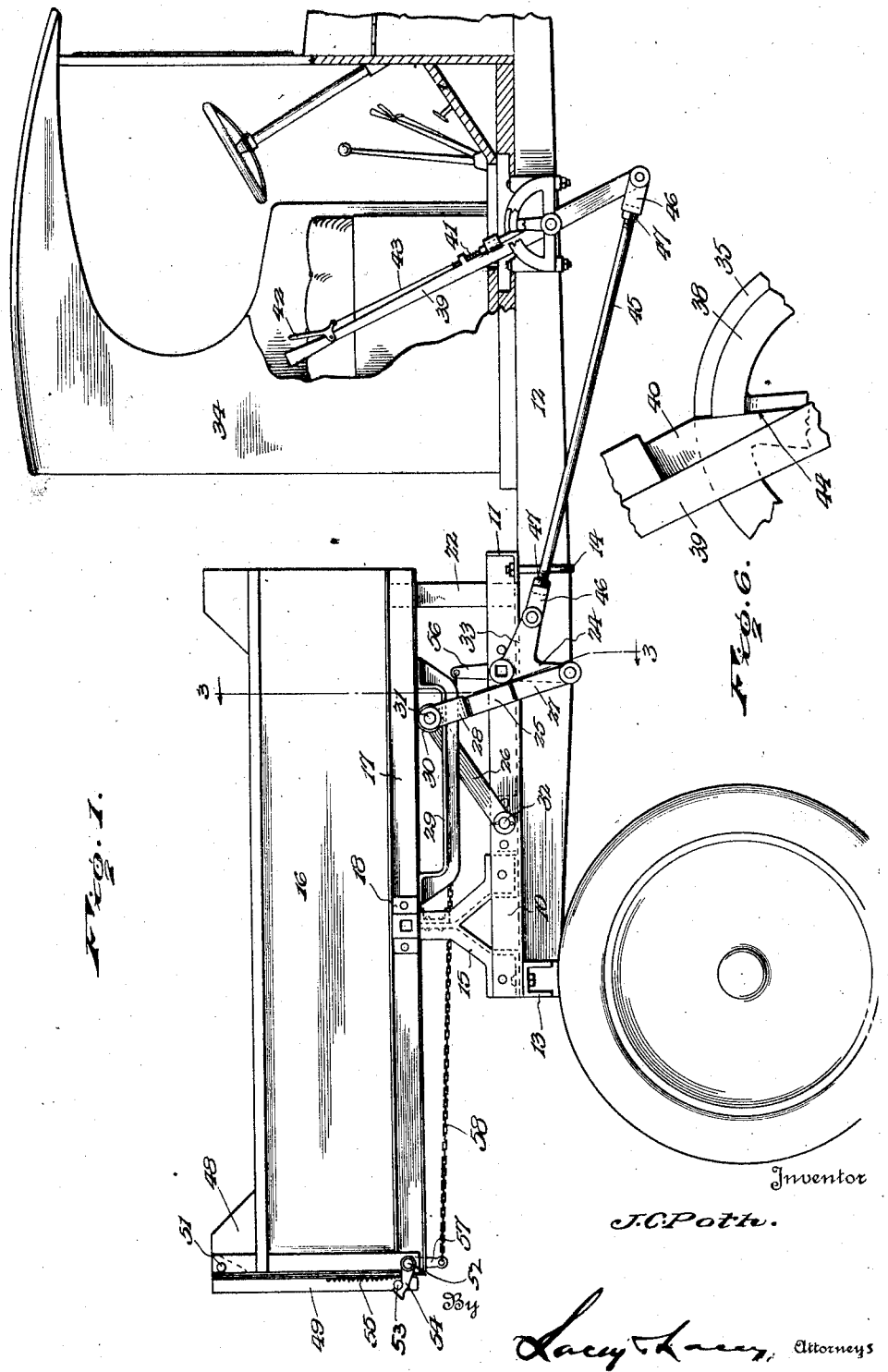
Inventor
J.C.Poth.
Lacy & Lacy, Attorneys

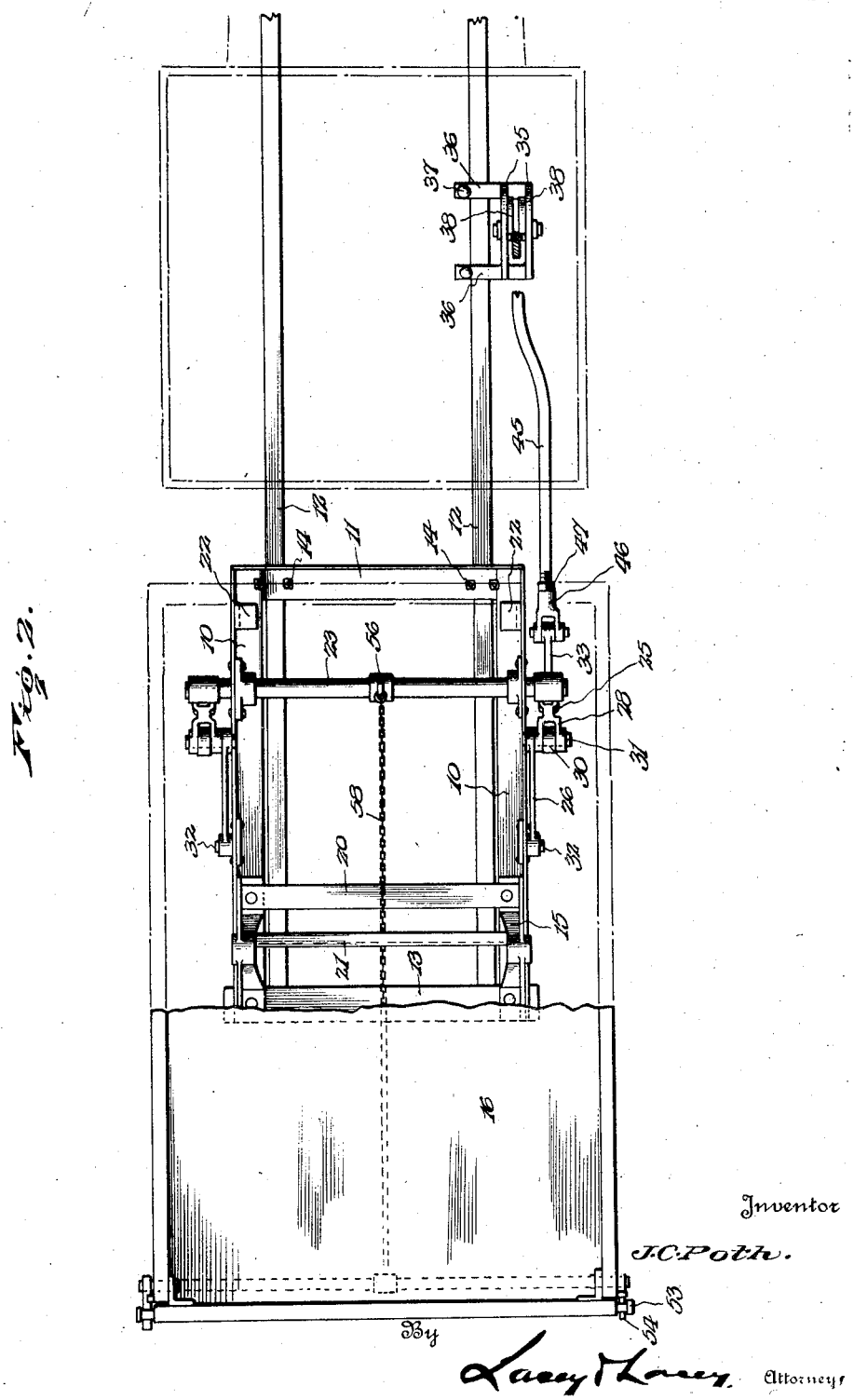

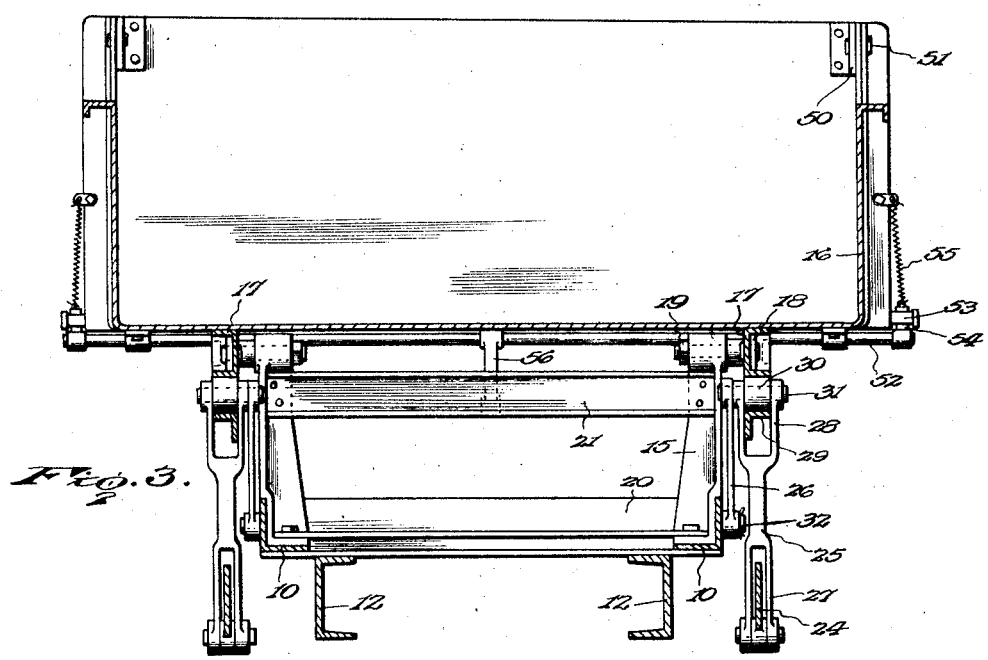
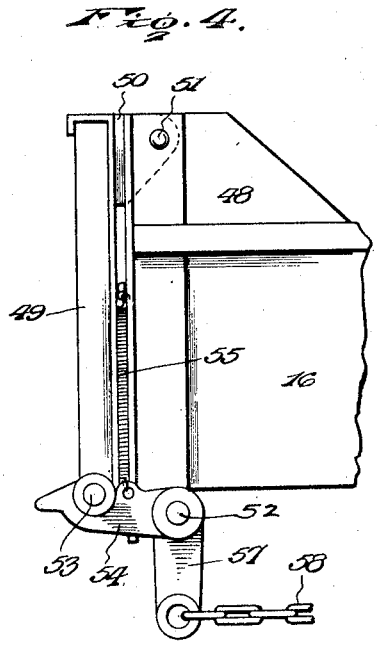
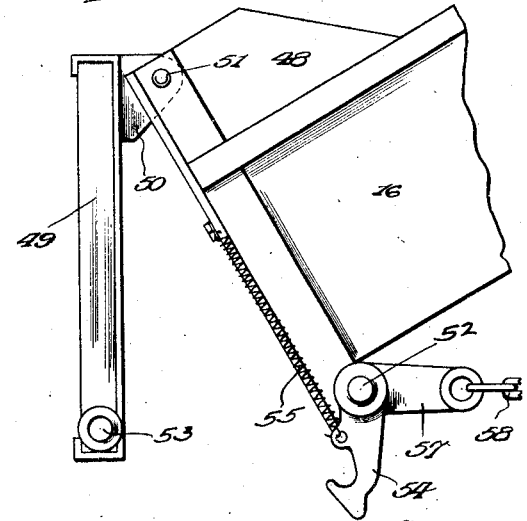

Patented July 12, 1927.

1,635,953

UNITED STATES PATENT OFFICE.

JOHN C. POTH, OF GALION, OHIO.

DUMPING UNIT FOR MOTOR TRUCKS.

Application filed October 2, 1924. Serial No. 741,254.

This invention relates to an improved dumping unit for motor trucks and seeks among other objects, to provide a unit of this character which may be readily applied to conventional trucks without the necessity for structural change therein and which will provide a simple, strong, efficient and durable structure.

The invention further seeks to provide a dumping unit embodying a system of levers whereby the body may be quickly tilted and dumped by hand.

Another object of the invention is to provide a simple and efficient means whereby the body may be easily and quickly locked in horizontal position so as to be positively held against accidental upward tilting such as might otherwise be caused by jolting or severe vibration.

And the invention still further seeks to provide an improved tail gate in connection with the body employed, wherein the tail gate will, when the body is tilted, automatically open, while, when the body is lowered, the tail gate will automatically close, and wherein means will be provided for automatically latching the tail gate when said gate closes as well as for automatically releasing the tail gate when the body is tilted.

Other and incidental objects will appear hereinafter.

In the drawings:

Figure 1 is a side elevation showing a conventional motor truck equipped with my improved dumping unit, parts being broken away and illustrated in section, Figure 2 is a top plan view of the structure, the body being partly broken away and the hand lever and associated parts being shown in section, Figure 3 is a vertical sectional view on the line 3—3 of Figure 1, looking in the direction indicated by the arrows, Figure 4 is a detail elevation showing the tail gate closed, Figure 5 is a detail elevation showing the tail gate open, and Figure 6 is a detail elevation particularly showing the latch employed for locking the body in normal horizontal position.

In carrying the invention into effect, I employ an oblong base frame comprising parallel side bars 10 connected at their forward ends by a front end bar 11. As particularly brought out in Figure 2, the base frame is formed for attachment to a motor vehicle chassis and in the drawings I have, for convenience, illustrated my improved dumping unit in connection with a conventional motor truck, the side bars of the frame of which are indicated at 12 while the rear end bar of said frame is indicated at 13. As will be observed, the side bars 10 of the base frame of the unit are disposed to extend longitudinally of the bars 12 at their outer sides while the rear ends of the bars 10 rest upon the rear end bar 13 of the chassis frame, to which end bar the side bars 10 are riveted or otherwise appropriately secured. Embracing the side bars 12 are U-bolts 14 extending through the front end bar 11 and securing the base frame at its forward end.

Fixed to the side bars 10 of the base frame at their rear ends are upstanding brackets 15 and pivotally mounted upon said brackets is a body 16. The body is preferably of sheet metal and extending along the bottom of the body near the side edges thereof are, as particularly shown in Figure 3, parallel bottom bars 17. Fixed to said bars are blocks 18 and extending through said blocks and through the brackets 15 are bolts 19 pivotally mounting the body. Extending between the forward legs of the brackets 15 is a transverse bracing bar 20 and extending between the upper end portions of the brackets is a second transverse bracing bar 21. Secured to the side rails 10 of the base frame near their forward ends are upstanding rests 22 to coact with the forward end of the body for supporting the body in horizontal position.

Journaled through the side bars 10 of the base frame near their forward ends is a transverse shaft 23 to the ends of which are fixed levers 24 and pivotally connected to said levers are rearwardly extending links 25 cooperating with which are somewhat shorter links 26. At their lower ends, the links 25 are provided with yokes 27 straddling the levers 24 while at their upper ends said links are provided with yokes 28, and fixed to the forward end portions of the bottom bars 17 of the body 16 to extend longitudinally therebeneath are guide rails 29 straddled by the latter yokes. Mounted in the free ends of the yokes 28 are, as particularly shown in Figure 3, rollers 30 which are snugly but revolubly received between the bottom bars 17 and the guide rails 29 and extending through said yokes and through the rollers are pins 31 journaling the rollers. As also best shown in Figure 3, these pins extend through the upper ends of the links 26 and thus serve to pivotally connect said links with the upper ends of the links 25. Fixed to the side bars 10 of the base frame adjacent the ends of the forward legs of the brackets 15 are trunnions 32 pivotally mounting the links 26 at their lower ends. Formed on the lever 24 at the right hand end of the shaft 23, as seen in Figures 1 and 2 of the drawings, is a forwardly projecting arm 33.

In the present instance, I have shown the motor truck illustrated as provided with a conventional cab 34 and mounted upon the right hand side bar of the chassis beneath the cab is a quadrant comprising parallel quadrant plates 35 from which extend yokes 36 straddling said side bar. Extending through the yokes at the inner side of the side bar are bolts 37 rigidly securing the quadrant in position so that, as will be appreciated, the quadrant may be readily attached. Formed on the plates 35 of the quadrant at their inner sides is a pair of like arcuate flanges 38 conforming to the curvature of said plates and pivoted at a point near its lower end between the plates is a hand lever 39 extending upwardly into the cab 34. The upper end portion of the lever is movable forwardly between the flanges 38 and slidably mounted upon the lever is a latch bolt 40 pressed downwardly to cooperate with said flanges by a spring 41. Pivoted upon the lever 39 is a latch handle 42 and connecting the handle with the latch bolt is a rod 43. The bolt is of a width greater than the distance between the confronting faces of the flanges 38 and, as shown in detail in Figure 6, is wedge-shaped at its lower end, being provided with a beveled forward face 44. Connecting the lower end of the hand lever 39 with the arm 33 of the lever 24 at the right of the chassis frame is a rod 45 equipped at its ends with yokes 46 pivotally connected to the lever and arm. The rod is screwed through the yokes so as to be adjustable and locking the rod in adjusted position are nuts 47.

Assuming now that the body 16 is disposed in horizontal position as shown in Figure 1, it will be seen in view of the foregoing description, that by lifting the latch bolt 40, the hand lever 39 may be swung forwardly for rocking the arm 33 in a downward direction and rotating the shaft 23 so that the levers 24 will be swung upwardly. Upward movement of these levers will, of course, impart an upward travel to the links 25, which links will, in cooperation with the links 26, exert an upward thrust upon the rollers 30 so that the rollers will be caused to coact with the bottom bars 17 of the body for tilting the body upwardly at its forward end and dumping the load therein. Thus, the body may be quickly tilted to dump the load, and by the arrangement of levers employed, this operation may be readily accomplished by hand. When the latch bolt 40 is lifted, the lower end thereof will ride over the flanges 38 of the quadrant plates 35 as the lever 39 is swung forwardly. Accordingly, after the load has been dumped and the lever 39 is swung rearwardly for returning the body to its normal position, the lower end of the bolt will, as shown in detail in Figure 6, drop behind the rear ends of said flanges to coact therewith for locking the body in such position. Furthermore, the beveled face 44 of the latch bolt will, under the spring tension upon the bolt, coact with the rear ends of said flanges for wedging the upper end of the lever 39 rearwardly so that the body 16 will be tightly held against the rests 22. Accidental upward tilting of the body will thus be effectually prevented while, at the same time, any slight oscillation of the body will also be overcome and, in this connection, it is to be observed that the rod 45 may be adjusted to take up any looseness which may develop between the parts.

Rising from the side walls of the body at its rear end are upstanding wings 48 and pivoted upon said wings is a tail gate 49. Secured to the end portion of the tail gate adjacent its upper edge are hinge plates 50 fitting between the wings 48 and extending through said plates and through the wings are pintles 51 which, as will be observed, are located in a plane forwardly of the rear end of the body. Accordingly, when the body is swung to horizontal position, the tail gate will, due to the disposition of the pivotal center thereof, automatically swing to closed position while, when the body is tilted, the tail gate will automatically swing open to permit the dumping of the load. Journaled beneath the body near its rear end is a transversely extending shaft 52 projecting at the sides of the body and extending horizontally from the lower corners of the tail gate are studs 53. Fixed to the ends of the shaft 52 to swing upwardly into engagement with said studs are catches 54 and connected to said catches are springs 55 pulling the catches upwardly. Upstanding from the shaft 23 is an arm 56. The shaft 52 is likewise provided with a depending arm 57 and connecting said arms is a chain or other suitable flexible element 58. Thus, as will be at once understood, when the shaft 23 is turned by the movement of the hand lever 39, for tilting the body 16, the arm 56 will be swung forwardly so that the shaft 52 will, in turn, be rotated for swinging the catches 54 downwardly out of engagement with the studs 53. Accordingly, the tail gate will be automatically freed to swing open as the body is tilted upwardly while, when the body is returned to its normal position and the tail gate swings closed, the catches 54 will be swung upwardly into engagement with said studs by the springs 55 for locking the tail gate shut.

Having thus described the invention, what I claim is:

1. In a dumping unit for motor trucks, a frame, a pivoted body carried thereby, a guide secured to the body at its forward end, coacting levers one pivotally connected with the frame, a yoke at the upper end of the other of said levers straddling said guide, a roller mounted in said yoke to coact with the guide and the body, a pin extending through the yoke journaling the roller and pivotally connecting the former lever with the latter lever, and means associated with the latter lever for actuating the levers and tilting the body.

2. In a dumping unit for motor trucks, a frame, a pivoted body carried thereby, bottom bars carried by the body, guides secured to said bars at the forward end portion of the body, pairs of coacting levers, rollers journaled at the upper ends of said levers to coact with said bottom bars and the guides, corresponding levers of said pairs being pivotally connected with the frame, a shaft carried by the frame, levers fixed to said shaft and pivotally connected to the other of the levers of said pairs of levers, and means for rotating said shaft and actuating the levers for tilting the body.

3. The combination with a frame, a body mounted to tilt thereon and means for tilting the body, of an operating lever for actuating the tilting means, spaced plates receiving the operating lever between them and having inwardly disposed arcuate flanges, and a latch bolt mounted upon the said lever and adapted to operate between the spaced plates and travel freely over the arcuate flanges and having its lower end beveled to engage the said flanges by a wedging action to secure the body in lowered position upon the frame.

In testimony whereof I affix my signature.

JOHN C. POTH. [L. S.]